United States Patent

[11] 3,559,798

[72] Inventor  Gerald D. Jacobsen
               1887 Holton Road, Muskegon, Mich.
               49445
[21] Appl. No. 757,599
[22] Filed     Sept. 5, 1968
[45] Patented  Feb. 2, 1971

[54] GLASS CASE
     3 Claims, 3 Drawing Figs.
[52] U.S. Cl. .................................................. 206/5,
                                                         150/0.5
[51] Int. Cl. ............................................... A45c 11/04
[50] Field of Search......................................... 161/227,
     255; 9/10, 8, 329; 150/0.5, 1; 200/5, (Material)

[56]            References Cited
            UNITED STATES PATENTS
2,962,158  11/1960  Struthers.................... 229/3.5X 3,332,646  7/1967  Kellett........................ 161/227X
1,760,604  5/1930  Paull et al.................... 9/10
2,558,996  7/1951  Ullmann....................... 9/8X

*Primary Examiner*—Joseph R. Leclair
*Assistant Examiner*—John M. Caskie
*Attorney*—Price, Heneveld, Huizenga & Cooper ABSTRACT: A glass case fabricated from a sheet of flexible and stretchable closed cellular elastomeric material having a stretchably resilient fabriclike outer skin bonded to one side thereof. The sheet of material is folded over upon itself to form a rectangular enclosure. The abutting edges of the material are secured together by gluing or stitching along the end and side of the case, one of the ends being left open to permit insertion and removal of the glasses into and from the case. The volume and density of the closed cellular elastomeric material are such that the case will float in water for an extended period of time despite the presence of a pair of glasses therein.

INVENTOR.
GERALD D. JACOBSEN

BY

ATTORNEYS

GLASS CASE

This invention relates to eye glass cases and, more particularly, to such cases particularly adapted for utilization by persons working in or recreating around the water.

Fishermen, boaters and the like often find it desirable for one reason or another to remove their eye glasses while performing particular tasks or enjoying particular forms of recreation around the water. These persons, ordinarily, store their eye glasses in a suitable case or on their person during these intervals. There exists a marked tendency for the glasses and case stored in such fashion to fall from the pocket during physical activity such as bending over, climbing into a boat or the like depending upon the particular pocket in which the glasses are placed. The glasses my may fall from the pocket, depending upon the particular type of case being utilized, either with or without the case. Such falling results often in breakage of the eye glasses should, per chance, they strike a solid object. Such falling results often, additionally, in the loss of the glasses because they have sunk into the water surrounding the particular individual involved.

Conventional eye glass cases, of course, will provide some protection against breakage when the glasses fall from the pocket. Such cases, additionally, will provide ordinarily a slight and highly temporary degree of flotation to the glasses should they drop directly in the water. Conventional cases saturate, however, rather quickly with water and will sink from reach within a very short time if the case and eye glasses contained therein is not retrieved quickly. If the glasses are dropped in a strong current, thus, there is little possibility of retrieving them prior to the saturation and sinking of the eye glass case. Such is true even if the glasses remain in position within the case. In the event that they slide from the case, of course, they are lost almost invariably.

It is an object of this invention, therefore, to provide an eye glass case suitable for utilization by persons actively engaged in work, recreation or the like around the water.

It is an object of this invention, more specifically, to provide a case which will positively retain glasses inserted therein despite physical manipulation of the case through falling, contact with obstacles or the like.

It is an object of this invention to provide a case of the type described having sufficient buoyancy to float the glasses should they happen to fall into the water for an indefinite period, the case not being subject to the absorption or saturation problems present in the prior art.

It is an object of this invention, additionally, to provide a case of the type described having a nonslip outer cover which, in addition to being attractive, functions to assist in the retention of the case within the particular user's pocket and, thus, avoid problems of retrieval from the water.

These as well as other objects of this invention will be readily understood with reference to the following specification and accompanying figures in which.

This invention comprises, briefly, an eye glass case including a pair of generally rectangular overlying wall members secured together at three of the abutting edges thereof to define therebetween an eye glass receptacle accessible from the nonsecured end. Each of the wall members includes an interior layer of flexible and resiliently stretchable closed cellular elastomeric material having a resiliently stretchable fabriclike outer skin bonded to the exposed surface thereof. The volume and density of the closed cellular material are of such proportions as to enable the case to float in water with a pair of eye glasses positioned therein.

Figure 1:
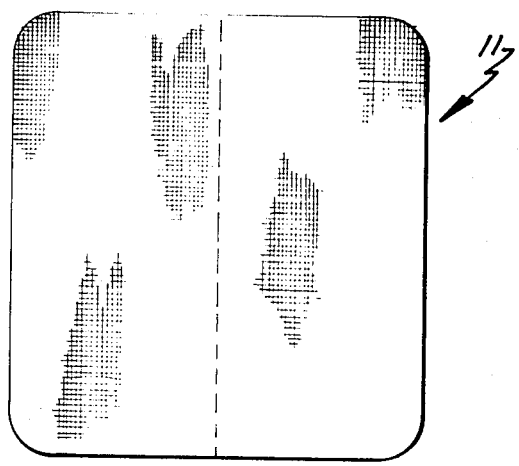
FIG. 1 is a plan view of a blank suitably shaped for forming the eye glass case which is the subject of this invention.
Figure 2:
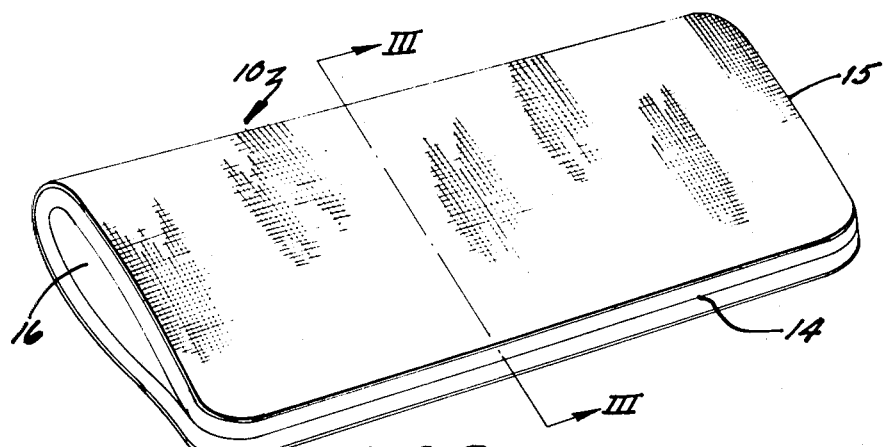
FIG. 2 is a perspective view of the case.

Referring now to the FIGS., a preferred embodiment of this invention will be described in detail. FIG. 1 shows a blank of material from which the glass case which is the subject of this invention can be formed. The blank has been cut from a sheet of laminated material, the details of which will be described hereinafter. The material is fabricated or received in sheets and the blanks 11 cut therefrom, for example, by a suitable die.

The case 10 is assembled by folding the blank 11 over onto itself such that the edges thereof abut. The side seam 14 and end seam 15 are then formed by gluing, stitching or the like. If desirable, a separate strip of material may be folded around sides 14 and end 15 prior to stitching to enhance the visual and structural characteristics of the finished product. One of the ends, of course, is left open to form the opening 16 through which the glasses are inserted into and removed from the case.

Figure 3:
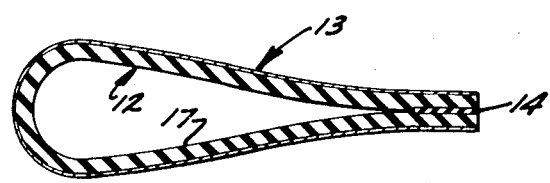
FIG. 3 is a cross-sectional view taken along plane III-III of FIG. 2.

Referring now specifically to FIG. 3, the material from which the case is formed has an inner layer 12 which is a flexible and stretchable closed cell or closed cellular material. This material should have the characteristics, inter alia, of ease of elongation, relatively high tensile strength and resistance to tearing. Any one of a number of elastometric materials can be utilized for the interior layer 12 of the case. It has been found, for example, that polychloroprene synthetic rubber will provide satisfactory results. Other materials, which may be utilized, are properly processed natural rubber, styrene butadiene synthetic rubber, nitrile butadiene synthetic rubber, chloroprene synthetic rubber, ethylene propylene synthetic rubber, urethane elastomer, or combinations of these materials with other elastometric materials.

The interior layer 12, as noted, is flexible and resiliently stretchable. It functions among other things to provide a cushion for the glasses when they are inserted into the case such that, if the case is dropped onto a solid object, the material will insulate the glasses from the direct shock and, thus, prevent their breakage. The interior layer 12, additionally, is closed celled to prevent the absorption of water. If material of suitable thickness is chosen, thus, a pair of glasses contained in the glass case will float virtually indefinitely and will not be lost because of sinking as is presently the case.

The outer covering 13 of the case consists, preferably, of a resiliently stretchable fabric or synthetic fabric such as nylon. This layer 13, of course, protects the closed-cell material 12 from scuffing, abrasion and the like. This layer, additionally, may be brightly colored in order to aid in finding one's glasses should, per chance, they have been dropped into the water or a substantial distance away onto a solid surface.

The skin or outer covering 13 is affixed to the inner layer 12, preferably prior to cutting of the blank indicated by the reference numeral 11 in FIG. 1. Such bonding is best accomplished by cementing it with a vulcanizable rubber cement, which cement may then be vulcanized to provide a firm bond of the nylon fabric to the compressible neoprene material 12.

The exterior surface of the nylon outer skin 13 is relatively rough and, consequently, reduces markedly the chances of the case and eye glasses contained therein falling from a person's pocket when he is bending, stooping or the like. In the event such falling occurs, however, the glasses are shielded from physical shock by the presence of the compressible inner layer 12 and from sinking into the water because of the closed-celled nature of the material 12.

The inner layer 12 and outer skin or layer 13, when bonded together, remain extremely flexible and resilient. The case, therefore, may be cut so as to be slightly smaller than or approximately the same size as the glasses to be kept therein. When the glasses are inserted through the opening 16, the resilient nature of the case permits it to expand resiliently to accept the glasses and, then, shrink or contract around them. Such shrinkage or contraction, of course, prevents positively the unintentional escape or falling of the glasses from the case. The glasses, therefore, will not slide unintentionally from the case and fall onto a solid object or into the water and be broken or lost. Dropping must occur, if at all, of the case with the eye glasses contained therein and, for reasons set forth previously in this specification, the glasses will not be damaged or lost.

A number of materials, as noted previously, may be successfully utilized in fabrication of the case which is the subject of this invention. One case, by way of example, was fabricated utilizing an inner layer 12 of polychloroprene synthetic rubber having a thickness of approximately one-eighth inch. This material, of course, is close-celled. To one surface of this material was affixed a nylon outer skin 13 by the vulcanizing procedure described previously. The blank 11 was then cut and the side and bottom glued together with a suitable cement. The resulting case was found to afford ample protection and flotation characteristics for eye glasses in accordance with the objects of this invention.

While a preferred embodiment of this invention has been described in detail it will be readily apparent to those skilled in the art that other embodiments may be conceived and fabricated without departing from the spirit of the specification and the accompanying drawings. Such other embodiments are to be deemed as included within the scope of the following claims unless these claims by their language expressly state otherwise.

I claim:

1. An eye glass case comprising a sheet of flexible, resilient and stretchable closed cellular plastic material having a stretchably resilient fabriclike outer skin fixedly secured to one side thereof, said sheet being folded over upon itself with said outer skin exposed and having its abutting edges secured together along two sides thereof, the remaining edges being unsecured to permit insertion and removal of eye glasses into and from said case, the volume, density and thickness of said material being such as to enable said case to float in water with a pair of eye glasses contained therein and to cushion a pair of eye glasses contained therein against breakage in the event the case and glasses fall onto a hard object.

2. The case as set forth in claim 1 wherein said material is polychloroprene synthetic rubber.

3. The case as set forth in claim 2 wherein said fabriclike skin is nylon.